US009245246B2

(12) United States Patent
Breitgand et al.

(10) Patent No.: US 9,245,246 B2
(45) Date of Patent: Jan. 26, 2016

(54) CAPACITY OVER-COMMIT MANAGEMENT IN RESOURCE PROVISIONING ENVIRONMENTS

(75) Inventors: David Breitgand, Modiin (IL); Amir Epstein, Herzelia (IL)

(73) Assignee: International Business Machines Corporation, Armonk, NY (US)

(*) Notice: Subject to any disclaimer, the term of this patent is extended or adjusted under 35 U.S.C. 154(b) by 322 days.

(21) Appl. No.: 13/612,855

(22) Filed: Sep. 13, 2012

(65) Prior Publication Data

US 2013/0007272 A1 Jan. 3, 2013

Related U.S. Application Data

(63) Continuation-in-part of application No. 12/764,987, filed on Apr. 22, 2010, now Pat. No. 8,732,310.

(51) Int. Cl.
*G06Q 10/06* (2012.01)
*G06F 9/50* (2006.01)

(52) U.S. Cl.
CPC .............. *G06Q 10/06* (2013.01); *G06F 9/5077* (2013.01)

(58) Field of Classification Search
CPC ...... H04L 47/823; H04L 12/911; G06F 9/505; G06F 9/5077
USPC ........................................................ 709/224
See application file for complete search history.

(56) References Cited

U.S. PATENT DOCUMENTS

| 6,804,714 | B1 * | 10/2004 | Tummalapalli | ............... | 709/224 |
| 6,965,930 | B1 * | 11/2005 | Arrowood et al. | ............ | 709/223 |
| 6,985,937 | B1 * | 1/2006 | Keshav | ................ | G06F 9/5077 370/231 |
| 6,990,666 | B2 | 1/2006 | Hirschfeld et al. | | |
| 7,536,373 | B2 | 5/2009 | Kelkar et al. | | |
| 7,606,895 | B1 * | 10/2009 | Dini et al. | ...................... | 709/224 |
| 7,668,703 | B1 | 2/2010 | Rolia et al. | | |
| 7,904,540 | B2 | 3/2011 | Hadad et al. | | |
| 8,073,721 | B1 * | 12/2011 | Lewis | .......................... | 705/7.12 |
| 8,103,486 | B1 | 1/2012 | Rolia et al. | | |
| 8,239,526 | B2 | 8/2012 | Simpson et al. | | |
| 8,250,582 | B2 | 8/2012 | Agarwala et al. | | |
| 8,291,411 | B2 | 10/2012 | Beaty et al. | | |

(Continued)

OTHER PUBLICATIONS

Amazon Web Services, "Amazon EC2 Instance Types", AWS Products & Solutions, Jul. 31, 2012 URL: http://aws.amazon.com/ec2/instance-types/.

(Continued)

*Primary Examiner* — Kevin Bates
*Assistant Examiner* — Mark A Scott
(74) *Attorney, Agent, or Firm* — Patricia B. Feighan; Eyal Gilboa

(57) ABSTRACT

Systems and methods for managing capacity over-commitment in a resource provisioning environment. The method comprising collecting historical data about capacity usage in a resource provisioning environment and failure statistics from an operational database, in addition to prior service commitments due to previously contracted service level agreements (SLAs) stored in a SLA repository; calculating equivalent capacity for the resource provisioning environment based on a defined residual benefit goal, and other business goals instrumented by way of a policy engine; and determining whether placing requested virtual resources on one or more hosts is feasible taking into account anti-collocation constraints that prohibit placement of two or more virtual resources on same host.

13 Claims, 11 Drawing Sheets

(56) References Cited

U.S. PATENT DOCUMENTS

| | | | |
|---|---|---|---|
| 8,332,847 B1* | 12/2012 | Hyser | G06F 9/45558 718/1 |
| 8,332,859 B2 | 12/2012 | Boss et al. | |
| 8,402,140 B2 | 3/2013 | Zhang et al. | |
| 8,458,334 B2 | 6/2013 | Sukthankar | |
| 8,489,742 B2* | 7/2013 | Clubb | 709/223 |
| 2002/0129157 A1* | 9/2002 | Varsano | 709/232 |
| 2002/0152305 A1 | 10/2002 | Jackson et al. | |
| 2003/0084018 A1* | 5/2003 | Chintalapati et al. | 707/1 |
| 2003/0204758 A1* | 10/2003 | Singh | 713/320 |
| 2004/0088404 A1* | 5/2004 | Aggarwal | 709/224 |
| 2005/0091352 A1* | 4/2005 | Alex | H04L 43/0817 709/223 |
| 2005/0256759 A1 | 11/2005 | Acharya et al. | |
| 2006/0161884 A1* | 7/2006 | Lubrecht et al. | 717/104 |
| 2006/0265470 A1* | 11/2006 | Rolia | G06F 9/5027 709/217 |
| 2007/0043860 A1 | 2/2007 | Pabari | |
| 2007/0067847 A1* | 3/2007 | Wiemer | H04L 63/1433 726/25 |
| 2007/0100892 A1* | 5/2007 | Kephart | G06Q 10/06 |
| 2007/0204266 A1* | 8/2007 | Beaty et al. | 718/1 |
| 2008/0028409 A1* | 1/2008 | Cherkasova | G06F 9/5061 718/104 |
| 2008/0049631 A1* | 2/2008 | Morrill | 370/250 |
| 2008/0059972 A1* | 3/2008 | Ding | G06F 9/505 718/105 |
| 2008/0092122 A1* | 4/2008 | Caprihan et al. | 717/127 |
| 2008/0104608 A1* | 5/2008 | Hyser et al. | 718/105 |
| 2008/0151766 A1 | 6/2008 | Khasnabish et al. | |
| 2008/0262822 A1* | 10/2008 | Hardwick et al. | 703/21 |
| 2008/0282321 A1* | 11/2008 | Hecht et al. | 726/1 |
| 2008/0295096 A1* | 11/2008 | Beaty | G06F 9/4856 718/1 |
| 2008/0301024 A1 | 12/2008 | Boss et al. | |
| 2009/0043888 A1* | 2/2009 | Jackson | G06F 9/468 709/225 |
| 2009/0052341 A1* | 2/2009 | Enqvist | 370/252 |
| 2009/0119673 A1* | 5/2009 | Bubba | G06F 9/50 718/104 |
| 2009/0216883 A1 | 8/2009 | Fellenstein et al. | |
| 2009/0235268 A1* | 9/2009 | Seidman et al. | 718/104 |
| 2009/0241108 A1* | 9/2009 | Edwards et al. | 718/1 |
| 2009/0248864 A1* | 10/2009 | Bugenhagen | 709/224 |
| 2009/0300605 A1* | 12/2009 | Edwards et al. | 718/1 |
| 2010/0125665 A1 | 5/2010 | Simpson et al. | |
| 2010/0131324 A1 | 5/2010 | Ferris | |
| 2010/0153377 A1* | 6/2010 | Rajan et al. | 707/723 |
| 2010/0293112 A1* | 11/2010 | Prahlad | G06F 3/0605 705/418 |
| 2010/0325634 A1* | 12/2010 | Ichikawa | G06F 9/4856 718/103 |
| 2011/0072138 A1* | 3/2011 | Canturk | G06F 9/5011 709/226 |
| 2011/0116376 A1 | 5/2011 | Pacella et al. | |
| 2011/0125894 A1 | 5/2011 | Anderson et al. | |
| 2011/0125895 A1 | 5/2011 | Anderson et al. | |
| 2011/0126275 A1 | 5/2011 | Anderson et al. | |
| 2011/0173329 A1 | 7/2011 | Zhang et al. | |
| 2011/0196908 A1* | 8/2011 | Sukthankar et al. | 709/201 |
| 2011/0202925 A1* | 8/2011 | Banerjee et al. | 718/104 |
| 2011/0264805 A1 | 10/2011 | Breitgand et al. | |
| 2011/0267980 A1* | 11/2011 | Calippe et al. | 370/254 |
| 2011/0307901 A1 | 12/2011 | Blanding et al. | |
| 2012/0246638 A1* | 9/2012 | He et al. | 718/1 |
| 2012/0250681 A1 | 10/2012 | Khasnabish et al. | |
| 2012/0271678 A1 | 10/2012 | Agarwala et al. | |
| 2012/0303400 A1 | 11/2012 | Boss et al. | |
| 2012/0303805 A1 | 11/2012 | Simpson et al. | |
| 2013/0007272 A1 | 1/2013 | Breitgand et al. | |
| 2013/0019011 A1 | 1/2013 | Breitgand et al. | |
| 2013/0024567 A1 | 1/2013 | Roxburgh et al. | |
| 2013/0238780 A1* | 9/2013 | Devarakonda et al. | 709/224 |
| 2013/0298134 A1* | 11/2013 | Jackson | G06F 9/505 718/104 |
| 2014/0033223 A1* | 1/2014 | Swart et al. | 718/105 |

OTHER PUBLICATIONS

Breitgand and Epstein, "SLA-aware Placement of Multi-Virtual Machine Elastic Services in Compute Clouds", IFIP/IEEE International Symposium on Integrated Network Management (IM'11), Dublin, Ireland, May 23-27, 2011.

Meng et al., "Efficient resource provisioning in compute clouds via vm multiplexing," in the 7th IEEE/ACM International Conference on Autonomic Computing and Communications, Washington, DC, USA, Jun. 2010.

Chen et al., "Effective vm sizing in virtualized data centers," in IEEE/IFIP IM'11,Dublin, Ireland, May 2011.

Urgaonkar et al., "Resource overbooking and application profiling in a shared internet hosting platform," ACM Transactions on Internet Technology, vol. 9, No. 1, 2009.

Jayasinghe et al., "Improving Performance and Availability of Services Hosted on IaaS Clouds with Structural Constraint-aware Virtual Machine Placement", 2011 IEEE International Conference on Services Computing (SCC), pp. 72-79, Jul. 4-9, 2011.

Curino et al., "Workload-Aware Database Monitoring and Consolidation", ACM, SIGMOD'11, Athens, Greece, Jun. 12-16, 2011.

Birkenheuer et al., "The Gain of Overbooking," Proceedings of the 14th Workshops on Job Scheduling Strategies for Parallel Processing (JSSPP), May 2009, University of Paderborn, Germany.

Chandra et al., "Quantifying the Benefits of Resource Multiplexing in On-Demand Data Centers," 2003, University of Massachusetts Amherst and IBM Almaden Research Center.

Chen et al., "A Systematic and Practical Approach to Generating Policies from Service Level Objectives," 2009, Hewlett Packard Laboratory and VMware Inc.

Cherkasova et al., "An SLA-Oriented Capacity Planning Tool for Streaming Media Services," Proceedings of the 2004 International Conference on Dependable Systems and Networks (DSN'04), 2004, Hewlett-Packard Laboratories, IEEE Computer Society.

Doyle et al., "Model-Based Resource Provisioning in a Web Service Utility," USENIX Symposium on Internet Technologies and Systems (USITS), 2003, IBM Research Triangle Park and Duke University.

Guérin et al., "Equivalent Capacity and Its Application to Bandwidth Allocation in High-Speed Networks," IEEE Journal on Selected Areas in Communications, Sep. 1991, p. 968-981, vol. 9, Issue 7.

Rolia et al., "A Capacity Management Service for Resource Pools," WOSP '05, Jul. 12-14, 2005, p. 229-237, ACM, Palma de Mallorca, Spain.

Sulistio et al., "Managing Cancellations and No-shows of Reservations with Overbooking to Increase Resource Revenue," CCGRID, 2008, p. 267-276, Proceedings of the 2008 Eighth IEEE International Symposium on Cluster Computing and the Grid.

Urgaonkar et al., "Resource Overbooking and Application Profiling in Shared Hosting Platforms," ACM SIGOPS Operating Systems Review, Winter 2002, vol. 36, Issue SI, Proceedings of the 5th Symposium on Operating Systems Design and Implementation.

Wikipedia, "Normal distribution," Last Modified on Oct. 7, 2014, p. 1-27, Wikipedia: the Free Encyclopedia, http://en.wikipedia.org/wiki/Normal_distribution, Accessed on Oct. 16, 2014.

Wikipedia, "Probability," Last Modified on Oct. 12, 2014, p. 1-10, Wikipedia: the Free Encyclopedia, http://en.wikipedia.org/wiki/Probability, Accessed on Oct. 16, 2014.

Wikipedia, "Set (mathematics)," Last Modified on Oct. 15, 2014, p. 1-10, Wikipedia: the Free Encyclopedia, http://en.wikipedia.org/wiki/Set_(mathematics), Accessed on Oct. 16, 2014.

Wikipedia, "Vector (mathematics and physics)," Last Modified on Oct. 4, 2014, p. 1-4, Wikipedia: the Free Encyclopedia, http://en.wikipedia.org/wiki/Vector_(mathematics_and_physics), Accessed on Oct. 16, 2014.

* cited by examiner

CAPACITY OVER-COMMIT MANAGEMENT IN RESOURCE PROVISIONING ENVIRONMENTS

CROSS-REFERENCE TO RELATED APPLICATIONS

The present application claims priority to and is a continuation-in-part of U.S. patent application Ser. No. 12/764,987 filed on Apr. 22, 2010, the content of which is incorporated herein by reference in its entirety.

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to over-committing resources in a virtualized computing environment, while taking into account placement constraints and adherence to a target risk level. More specifically, historic data on resource usage is used to predict potential placement constraints in a virtualized environment and to determine the feasibility and risks for over-committing resources.

BACKGROUND

Infrastructure as a service (IaaS) delivers computer infrastructure as a service in a virtualized computing environment. Service subscribers and clients, rather than purchasing servers, software, data center space or network equipment, instead buy those resources as a fully outsourced service. The service is typically billed on a utility computing basis. The amount of resources consumed and therefore the costs are based on the level of subscriber activity.

In general, a server layer is configured to include computer hardware or computer software products that are specifically designed for the delivery of services to a particular subscriber. The services may include access to multi-core processors, cloud-specific operating systems and additional computing services. Some IaaS provisioning platforms provide resources for information technology communication (ITC) where availability of resources is guaranteed according to service level agreements (SLAs).

One embodiment of the IaaS paradigm is an infrastructure computing cloud (ICC). In an ICC, the subscribers purchase ITC resources in the form of virtual machines (VMs), virtual storage, or virtual networks. The subscribers are charged according to a pay-as-you-go model. The subscribers may purchase ITC resources from an ICC provider by a single subscriber in the framework of a single SLA as virtual resources set (VRS). With ICC, cloud subscribers are offered capacity on demand to match variations in workload. Accordingly, the number of VM instances in VRS may dynamically change.

To explicitly set contractual obligations on availability of resources, ICC subscribers may specify the range of resources of every type that is needed. That is, a subscriber may designate the maximum or minimum number of VM instances of every type of service that it may want to reserve. The values that set the reserved range for each resource are referred to as capacity ranges. Availability SLA for VMs within each range is specified by way of one or more availability service level objective (SLO) clauses.

ICC providers strive to maintain a minimal capacity that is sufficient to guarantee the VRSs' SLA commitments subject to the acceptable risk level of non-compliance, as controlled by the ICC provider's business policy. The minimal capacity is the equivalent capacity that is defined for each type of resource, based on the number of instances of the resource that is needed to support all the resource demand of services with the particular level of congestion as a function of the acceptable risk level.

The equivalent capacity may be presented as a vector of resources, where for each type of resource, it is indicated how many instances of a resource are to be dynamically provisioned or deprovisioned to satisfy the calculated risk level. When system load increases, more VMs may be provisioned to prevent over-utilization. When the load subsides, some VMs may be deprovisioned to prevent under-utilization.

As an example, VMs may be dynamically provisioned and deprovisioned in a high performance cluster (HPC) service or a virtualized data center. Since maximal demand, in terms of number of VMs, of different services or users in the above-noted virtualized computing environments usually do not peak together, over-committing of the physical capacity of the VMs is possible.

Over-committing increases resource efficiency so that more VMs can be hosted on the same physical infrastructure than allowed by the total physical capacity. Over-commitment of resources is desirable and may be tolerated only to the extent that the over-commitment does not result in excessive risk of resource congestion and non-compliance with SLAs.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for managing capacity over-commitment in a resource provisioning environment comprises collecting historical data about capacity usage in a resource provisioning environment and failure statistics from an operational database, in addition to prior service commitments due to previously contracted service level agreements (SLAs) stored in a SLA repository; calculating equivalent capacity for the resource provisioning environment based on a defined residual benefit goal, and other business goals instrumented by way of a policy engine; and determining whether placing requested virtual resources on one or more hosts is feasible taking into account anti-collocation constraints that prohibit placement of two or more virtual resources on same host.

In accordance with one or more embodiments, a system comprising one or more logic units is provided. The one or more logic units are configured to perform the functions and operations associated with the above-disclosed methods. In yet another embodiment, a computer program product comprising a non-transitory computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

Figure 1:
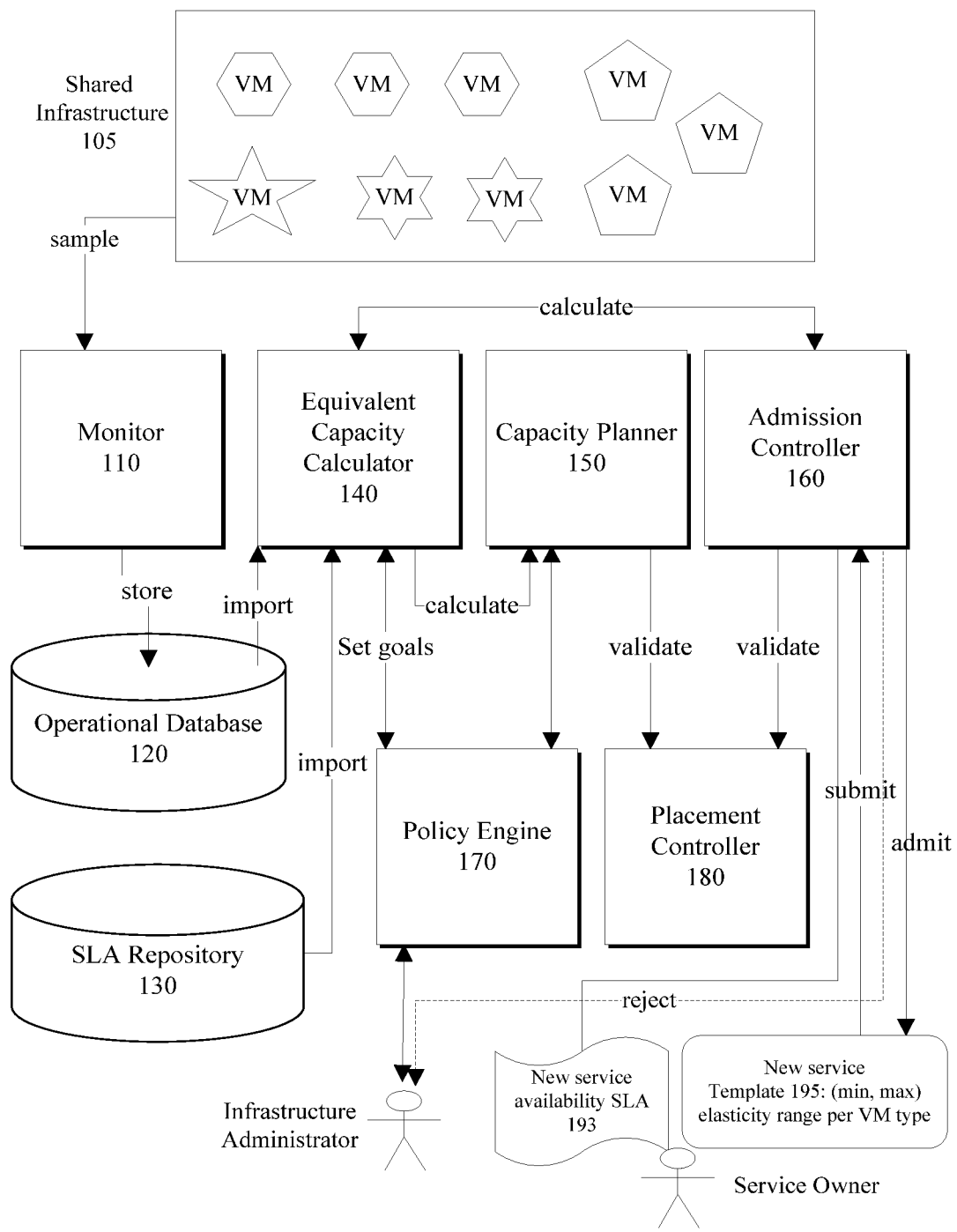
FIG. 1 illustrates an exemplary operating environment in accordance with one or more embodiments wherein the capacity of resources in a virtualized computing system is calculated.

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one or more embodiments, the allocation of virtual resources may be managed based on service level agreements (SLAs) that define the quality of service (QoS) for the resources in a way to optimize the throughput of the system and support multiplexing of resources without resulting in congestion. Within the context of this disclosure, throughput optimization refers to maximizing system yield with minimal congestion, where congestion is defined as significantly over-allocating the available physical resources to the point that QoS cannot be guaranteed.

Equivalent capacity in this context refers to the minimum allocated capacity sufficient to guarantee QoS commitments subject to the acceptable risk level of non-compliance due to congestion, such that equivalent capacity is as close to physical capacity as possible. In accordance with one embodiment, a service subscriber may designate the maximum or minimum number of VM instances of the type of services that the subscriber would like to reserve probabilistically, i.e., with the required level of success probability. The values that set the reserved range for each resource are referred to as capacity ranges. The availability of SLA for VMs within each range is specified by way of one or more availability service level objective (SLO) clauses.

The SLOs, in one exemplary embodiment, are generated in the following form: "With probability P, capacity range R=[Min, Max] for virtual resource R of type X will be guaranteed throughout the usage window W with probability P computed over SLA evaluation period E." Each virtual resource or VM is characterized based on its virtual central processing units (CPUs), memory, virtual disks or virtual network interfaces. Similarly virtual network and disks are characterized by minimal and maximal available bandwidth and minimal and maximal volumes, respectively. Other attributes of virtual resources may be considered as well.

In one embodiment, a subscriber is responsible for determining the needed level of service. The subscriber's capacity demands reflect the actual needs of the service to guarantee end-user QoS under different circumstances (e.g., different workload levels, different hours, etc). Thus, by guaranteeing availability of the requested capacity ranges (i.e., by guaranteeing the elasticity demands of a service), the infrastructure provider also protects the application-level QoS of the service.

SLAs specify financial penalties for SLA non-compliance. To avoid SLA non-compliance which may lead to significant financial repercussions for the service provider, a service provider plans the ICC capacity in such a way as to maximize the infrastructure yield on the one hand, and minimize the SLA non-compliance effect on the other hand. In one embodiment, to avoid SLA non-compliance the service provider may over-provision capacity. However, extensive over-provisioning is costly and may off-set the benefits of maximizing SLA compliance. Therefore, depending on implementation, yield maximization and risk of non-compliance may be traded against each other.

In one implementation, due to variability in workloads imposed by different subscribers, the service provider's capacity is multiplexed among a plurality of subscribers. Multiplexing capacity reduces over-provisioning, but increases probability of non-compliance. Optionally, an elastic VRS may be guaranteed to be able to grow to its maximal size as contracted by the VRS SLA. However, if the available physical capacity is excessively multiplexed, the service provider may not be able to meet the guarantee if congestion occurs (i.e., if too many VRSs try to grow simultaneously and exceed the physical capacity of the provider).

It is noteworthy that each service provider may have its own acceptable risk level (ARL) with respect to SLA non-compliance that may occur due to congestion. These differences stem from the possibly different business goals pursued by different service providers. A service provider may define the ARL, capacity management and admission control policies using a computer implemented policy engine. If the available physical capacity is smaller than the equivalent capacity, SLAs may not be guaranteed at the ARL level. Conversely, if available physical capacity is greater than the equivalent capacity and feasible placement of the virtual resources belonging to the VRSs exists for an equivalent capacity for resource ranges defined for a usage windows, then availability SLAs of all VRSs are protected at all times with probability=1−ARL.

Referring to FIG. 1, an exemplary operating environment 100, in accordance with one or more embodiment, is illustrated. The operating environment 100 comprises a monitor 110, an operational database 120, an SLA repository 130, an equivalent capacity calculator 140, a capacity planner 150, an admission controller 160, a policy engine 170, and a placement controller 180. One or more of the above elements may be controlled by an infrastructure administrator, wherein a shared infrastructure 105 having a plurality of VRSs (e.g., VMs) is used to service the requests of a service owner (e.g., a client, a subscriber, etc.).

Monitor 110 monitors operational data about the shared infrastructure 105 and VRSs to collect historical data inputs as provided in further detail below. Operational database 120 is utilized to store the operational data collected by monitor 110. SLA repository 130 stores the SLAs for the VRSs. The SLAs may be used for capacity planning and admission control by capacity planner 150 and admission controller 160. Equivalent capacity calculator 140 calculates equivalent capacity needed to protect SLAs at the 1-ARL level. Capacity planner 150 uses equivalent capacity computed by equivalent capacity calculator 140 to provide recommendations about the allocation of resources to maintain proper physical capacity.

In one implementation, admission controller 160 uses SLA repository 130, operational data 120 and equivalent capacity computed by equivalent capacity calculator 140 to estimate the SLA incompatibility risks, if a new VRS is added to the system. A new VRS may be added if a new service is accepted or if SLA terms of an existing VRS are renegotiated. An optional policy engine 170 may be included to serve as a management tool to set and maintain policies to deal with capacity planning and admission control. A placement controller 180 may be utilized to validate whether a feasible deployment (i.e., placement) of VMs or VRSs is possible, prior to actual allocation or deployment of resources.

In the exemplary operating environment 100, a risk level policy may be set by the infrastructure administrator and a new service request may be submitted to admission controller 160. Admission controller 160 may alert a human controller (e.g., the infrastructure administrator) if level of risk is not acceptable. The human controller may authorize system rejection or increase system bandwidth and resources or take other action to remedy the situation alerted of. Admission controller 160 may provide the new service request to equivalent capacity calculator 140. Equivalent capacity calculator 140 calculates the equivalent capacity and provides it to capacity planner 150 and placement controller 180 to test and validate the equivalent capacity. Placement controller 180 returns the result to admission controller 160 to indicate whether the risk level based on historical data is acceptable.

Figure 2A:
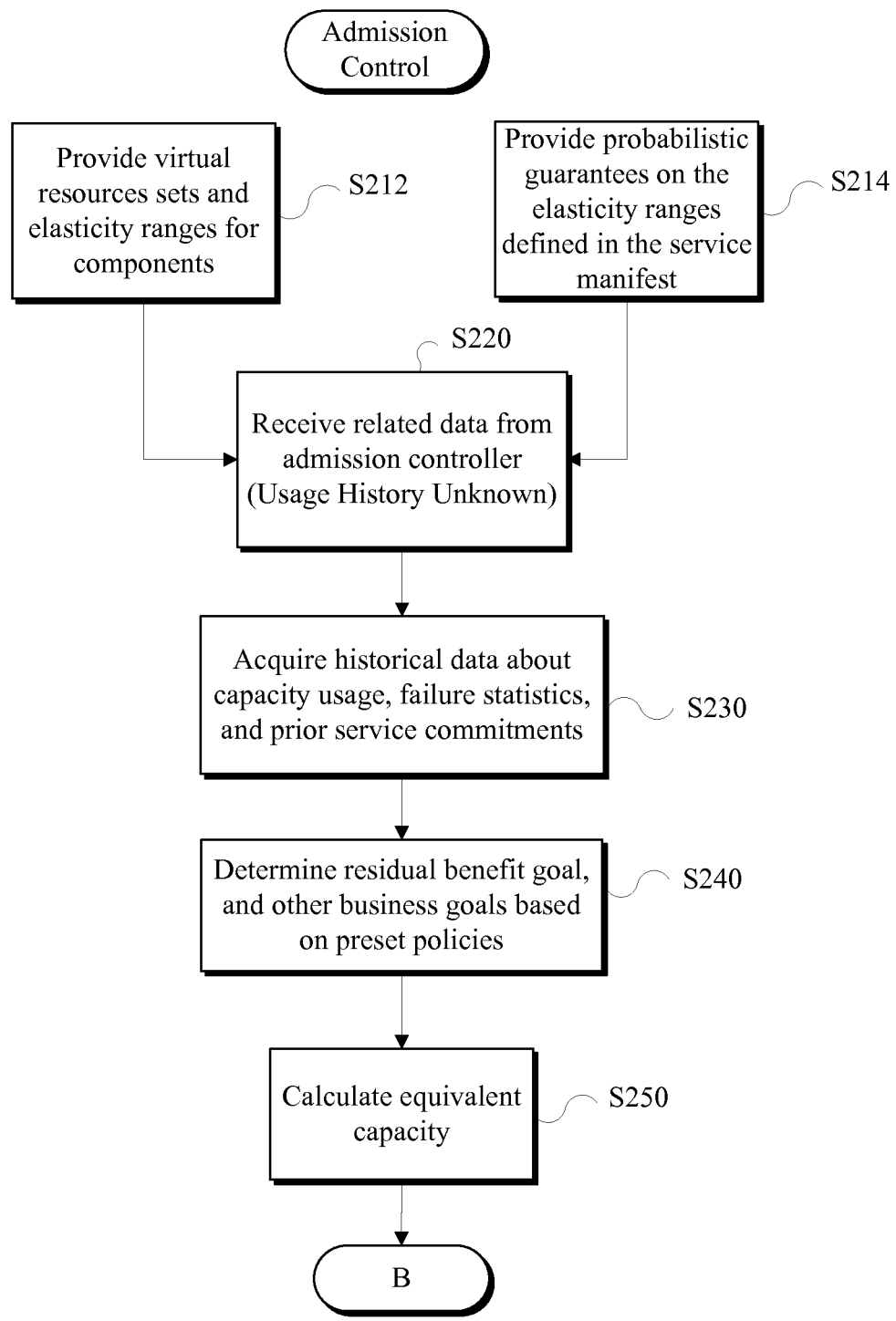
FIGS. 2A, 2B and 2C are flow diagrams of methods for admitting and planning the use of historical data collected based on allocated capacity to different resources to manage future allocation of capacity for the resources in a virtualized computing system, in accordance with one embodiment.
Figure 2B:
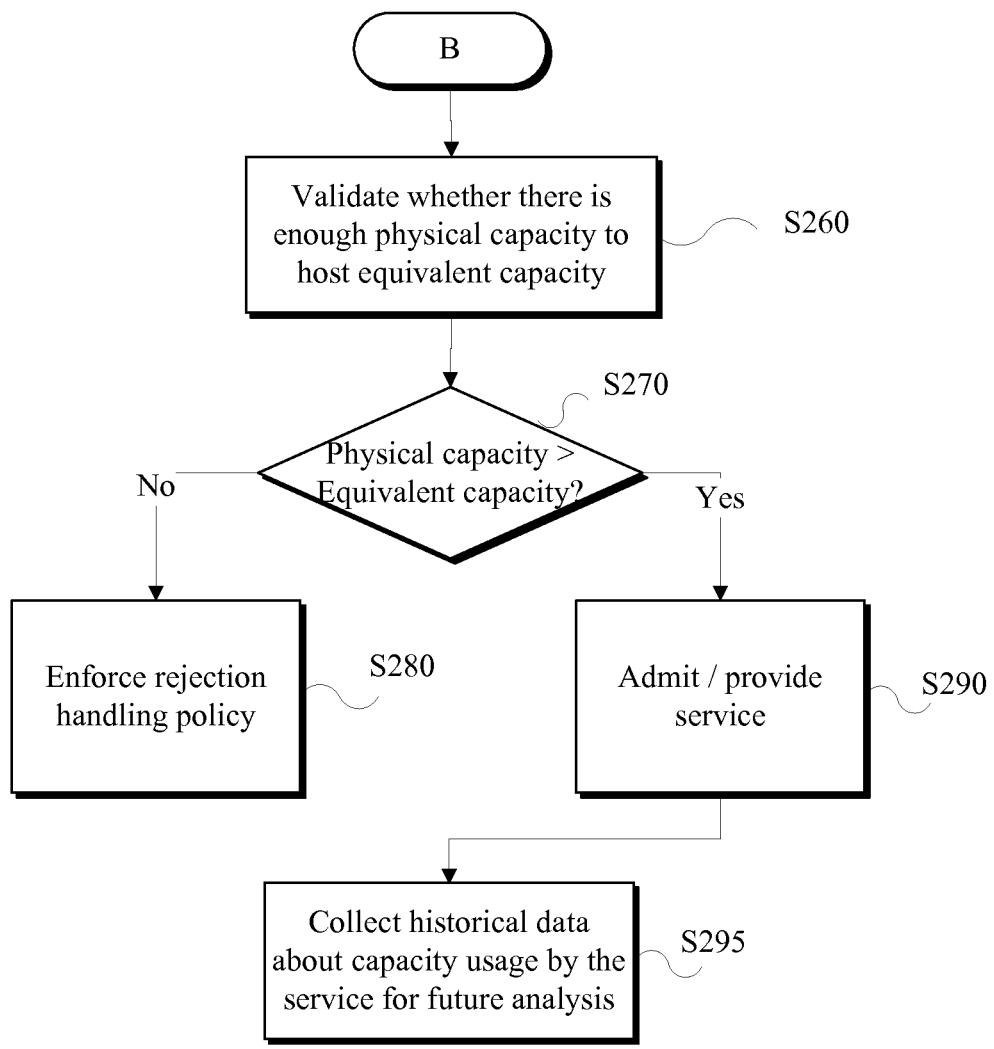

Referring to FIGS. 1, 2A and 2B, the admission control process is discussed in further detail as illustrated in the depicted exemplary flow diagrams in the drawings. According to one aspect, a service owner may provide a new service availability SLA and new service template 195 in the form of a service manifest (e.g., a structure template) to admission controller 160 to provide VRSs and elasticity ranges for components and the probabilistic guarantees on the elasticity ranges defined in the service manifest (S212, S214). Admission controller 160 may combine the information provided by the service owner. The result of the calculations by the admission controller 160 may be received by the equivalent capacity calculator 140 (S220). In one embodiment, at this stage, usage history for the new service is unknown, and therefore a worst case scenario is assumed for the purpose of calculating equivalent capacity.

Upon invocation, equivalent capacity calculator 140 acquires historical data about capacity usage in the system and failure statistics from the operational database 120, in addition to prior service commitments due to already contracted SLAs from the SLA repository 120 (S230). Equivalent capacity calculator 140 may also receive the ARL, residual benefit goal, and other business goals from the policy engine 170 to calculate equivalent capacity for the new service (S250). In one embodiment, placement controller 180 is responsible for actual placement of the virtual resources on the physical resources and is utilized to validate whether there is enough physical capacity to host the calculated equivalent capacity (S260, S270).

Figure 2C:
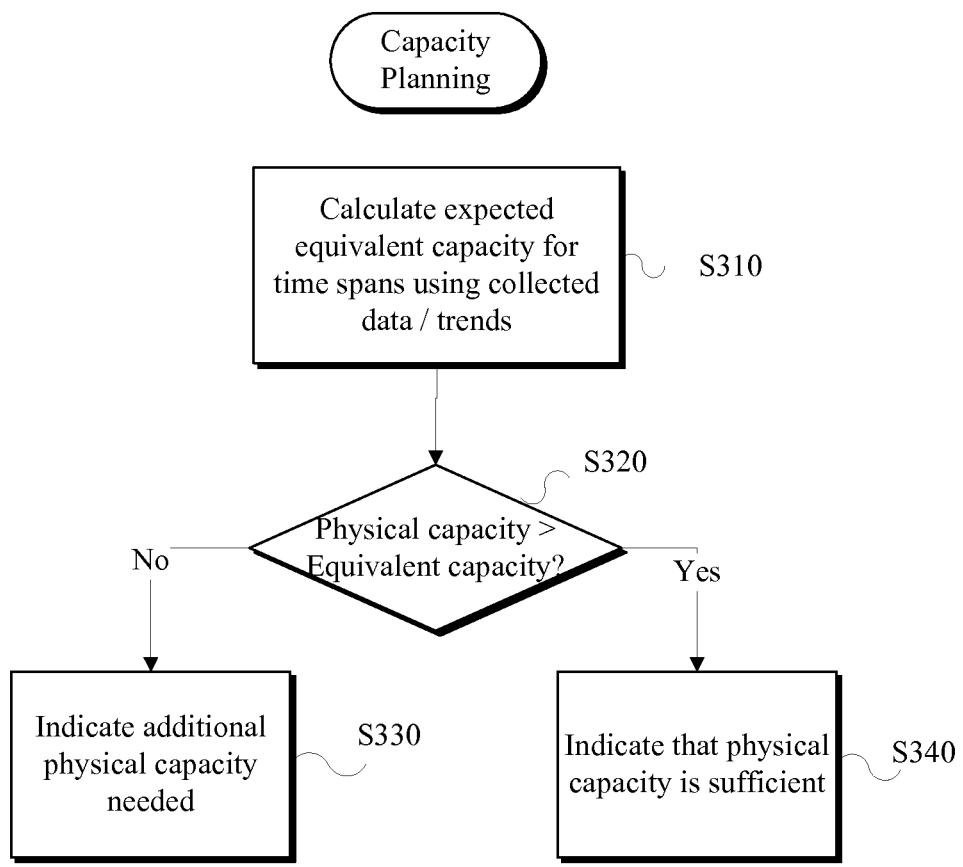

A suitable placement algorithm may be utilized by placement controller 180 in order to realize the validation. Depending on implementation, if the physical capacity is insufficient to host the calculated equivalent capacity, then a rejection handling policy is enforced (S280). Otherwise, the requested service is admitted or provided (S290). In some embodiments, with passage of time, actual data about capacity usage by the admitted or requested service will be collected and used by equivalent capacity calculator 140 for future capacity planning. Referring to FIG. 2C, for example, the capacity planning process in accordance with one embodiment is disclosed in further detail.

As shown in FIG. 2C, the equivalent capacity calculator 140 is periodically invoked to calculate expected equivalent capacity for different time frames (i.e., windows) based on data that suggests use trends and other relevant information collected and stored in operational database 120 and SLA repository 130 (S310). If the results indicate that the physical capacity is insufficient to host equivalent capacity the capacity planner 150 is notified that additional physical capacity is needed to cover the calculated equivalent capacity (S320, S330). Otherwise, it is determined that the physical capacity is sufficient to cover the calculated expected capacity (S340).

In one embodiment, the equivalent capacity calculator 140 and capacity planner 150 are implemented to take into account constraints that prohibit placement of two or more VMs on the same host. Such constraints are referred to as anti-collocation constraints. If there is no feasible placement for equivalent capacity, then there is no feasible placement for equivalent capacity augmented with anti-collocation constraints. Therefore, in one embodiment, the placement controller 180 is configured to determine whether a feasible placement for equivalent capacity exists and to issue an unsafe over-commit level warning, if no feasible placement is found. If the feasible placement for equivalent capacity exists, the anti-collocation constraints are factored into the placement computation of as provided in further detail below.

In one implementation, to account for anti-collocation placement restrictions in VM groups (i.e., groups that correspond to service tiers or clusters), data about the number of VMs in each group is monitored and saved. In other words, for each service, the number of VMs in each tier is monitored. Said values are treated as random variables and their empirical probability distribution functions (PDF) is computed. The empiric PDFs are then used to generate a random placement problem instance. For each service, for each tier, a number of VMs in accordance with the empirical PDF of its tier is generated.

Figure 3A:
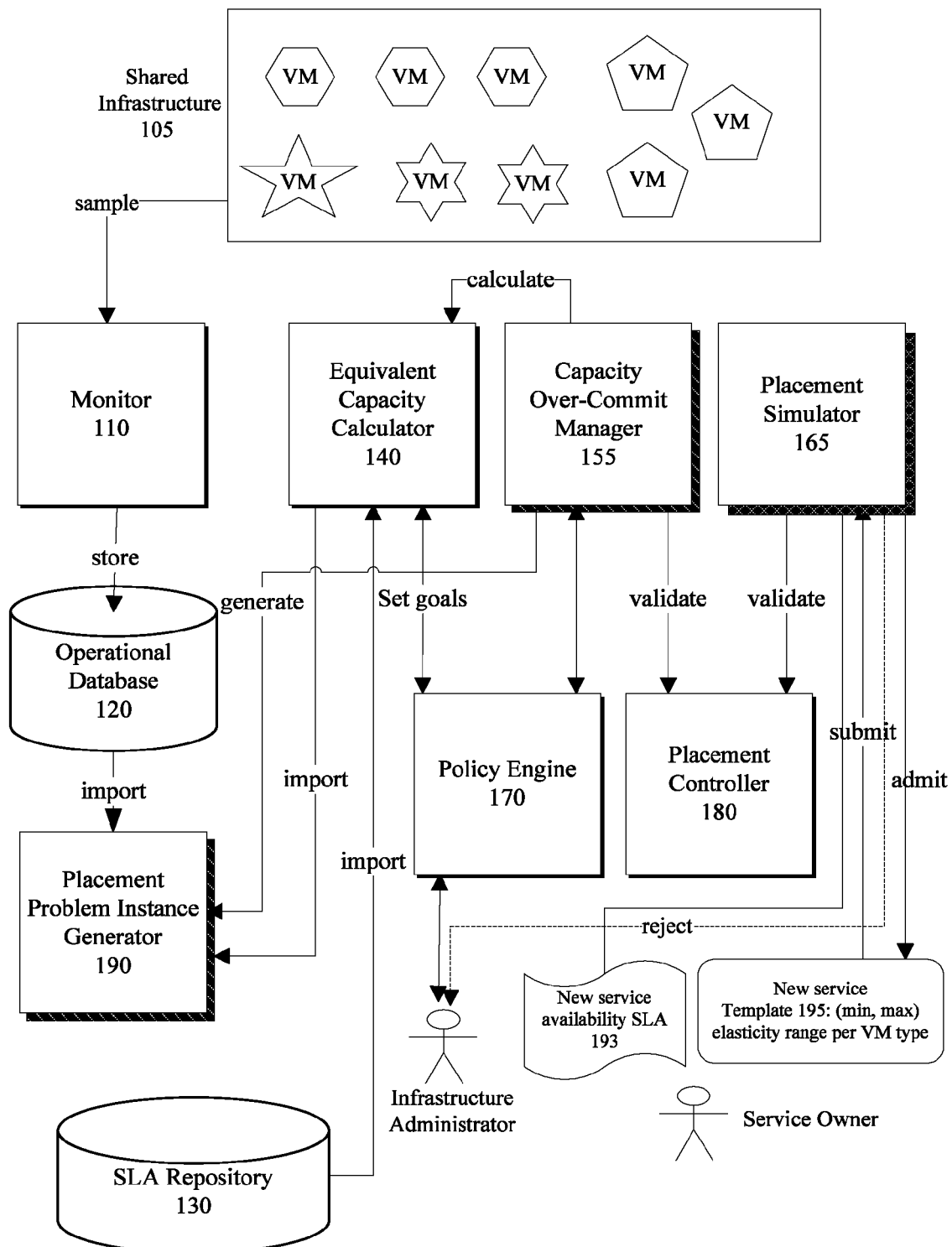
FIG. 3A illustrates an exemplary operating environment in accordance with one or more embodiments wherein resources in a virtualized computing system may be over-committed at an acceptable risk level.

Referring to FIG. 3A, in accordance with one embodiment, an improved operating environment 300 is provided. As shown, operating environment 300 comprises monitor 110, operational database 120 that includes historical VM allocation data, an equivalent capacity calculator 140, a placement problem instance generator 190, a placement controller 180, a capacity planner (not shown) working in conjunction with a capacity over-commit manager 155. Other components such as policy engine 170 and SLA repository 130 may be also present in operating environment 300.

As noted earlier, for each service, in each service tier, monitor 110 is configured to monitor the number of VMs in each tier. In the example operating environment 300, VMs may be provided from a catalogue of discrete sizes (e.g. . . . , EC2-VM types, also known as VM types). If such discrete sizes do not exist in the operating environment 300, the VMs may be categorized into a number of types (e.g., by mapping the VM's nominal resource allocation into a number of non-overlapping intervals). It is noteworthy that, in one embodiment, VMs of the same tier are determined to have the same type. Operational database 120 is utilized to store the noted VM types and categorization and to provide this information to equivalent capacity calculator 140 to calculate equivalent capacity as provided in detail earlier.

In one embodiment, placement problem instance generator 190 extracts the information stored in operational database 120 to calculate empirical PDF for the number of VMs of each tier for each service. For example, if c denotes the nominal capacity requirements for a VM type, then $p\_\{i,j\}^\{c\}(k)$ would be the empirical probability of service i having k VMs of type c in tier j. Then, for each service i, for each tier j, placement problem instance generator 190 generates VM group of type c of size k with probability $p\_\{i,j\}^\{c\}(k)$ where a type refers to the physical configuration of the VM's resources (i.e., the discrete configuration of virtual hardware for a VM in a cloud/catalogue of instances of VMs that may be ordered).

It is noteworthy that in a tier, the VMs are of the same type as the various VM types may naturally occur in multi-tier services. Tiers of service indicate the structure of services at the service provider level. For example, three separate tiers may be defined: http server tier, application server tier, and database tier. In one embodiment, a constrained placement instance generated by placement problem instance generator 190 may be submitted to capacity over-commit manager 155 to determine whether a feasible placement for the instance exists by calling placement controller 180 as provided in further detail below.

Figure 3B:
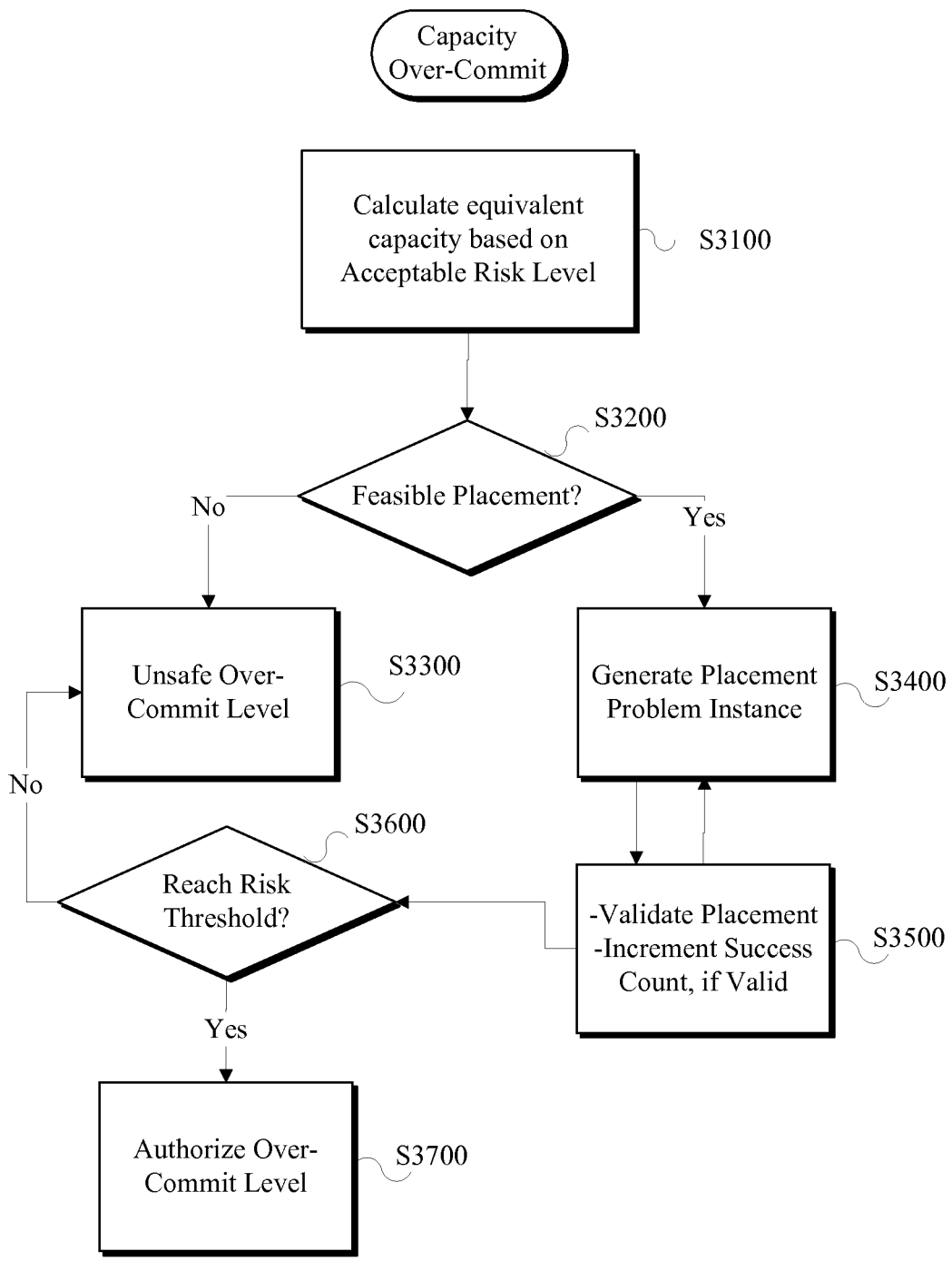
FIG. 3B is a flow diagram of a method for calculating the risk for over-committing resources in a virtualized computing system, in accordance with one embodiment.

Referring to FIG. 3B, in accordance with one embodiment, capacity over-commit manager 155 calls equivalent capacity calculator 140 to calculate equivalent capacity based on data stored in operational database 120, taking into account the acceptable risk level (S3100). Placement controller 180 may receive one or more constraint placement instances and use a placement algorithm disclosed earlier to find the proper placement for one or more VMs or VM groups. It is noteworthy that aside from the placement algorithm disclosed here any suitable placement algorithm may be used to place VM groups with anti-collocation constraints.

In one implementation, capacity over-commit manager 155 may call placement controller 180 to validate whether the calculated equivalent capacity has a feasible placement (S3200). If not, capacity over-commit manager 155 may generate an error message warning of unsafe over-commit levels (i.e., alert that the current over-commit level exceeds a target risk) (S3300). If feasible placement for un-constrained equivalent capacity exists, then capacity over-commit manager 155 calls placement problem instance generator 190 to generate one or more new placement instances based on the data from operational database 120 (S3400).

Capacity over-commit manager 155 may call placement controller 180 to validate the placement instances (and increment a success count, if the placement is validated) (S3500). The above validation procedure may be repeated a number of times as specified by configuration of capacity over-commit manager 155 (e.g. . . . , see the loop controlled by success count in S3500 for controlling a repeat of the validation process while a prior placement remains valid). The result of the placement may be either "placement exist" or "placement does not exist" (e.g., 1 or 0).

Capacity over-commit manager 155 may use the outcome of the placement and previous placement validation outcomes to calculate the probability of finding a placement for a constrained placement problem. This calculation has a level of statistical significance, which is dependent on the number of experiments involving the generation and validation of various instances. If a target significance level (e.g., provided as an input parameter) is achieved, capacity over-commit manager 155 compares the calculated risk probability to the target risk probability and indicates the outcome to the user.

In one example embodiment, an administrator may control the number of times (N) that the instance generation or validation is to be repeated. In another example embodiment, an administrator may define a significance level, where N is automatically computed using the observation that the sum of VMs of each type generated by placement problem instance generator 190 follows a Normal distribution. As such, the number of samples (i.e., iterations) may be obtained by estimating confidence interval for a mean of the Normal distribution.

In one implementation, upon the conclusion of the instance generation and validation process, capacity over-commit manager 155 checks whether target risk level of resource congestion does not exceed a risk threshold (S3600). In other words, it is determined whether percentage of failures in the above noted placement trials exceed a threshold risk probability. Depending on the outcome, capacity over-commit manager 155 may declare the current level of over-commit unsafe (S3600) or safe and authorize the over-commit level (S3700).

According to the above process, the placement instances are empirically generated and validated to help provide a statistical significance of placement validation. If placement problem instance generation and validation experiment are treated as a Bernoulli trial, the sum of successful experiments follows a Binomial distribution with parameters B(n, p), where n is the number of experiments and p is the probability of success in these experiments. The probability of failure 1-p can be estimated at some level of significance. Then, the estimated failure probability can be compared with the acceptable risk level to decide whether over-commit is safe or not.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
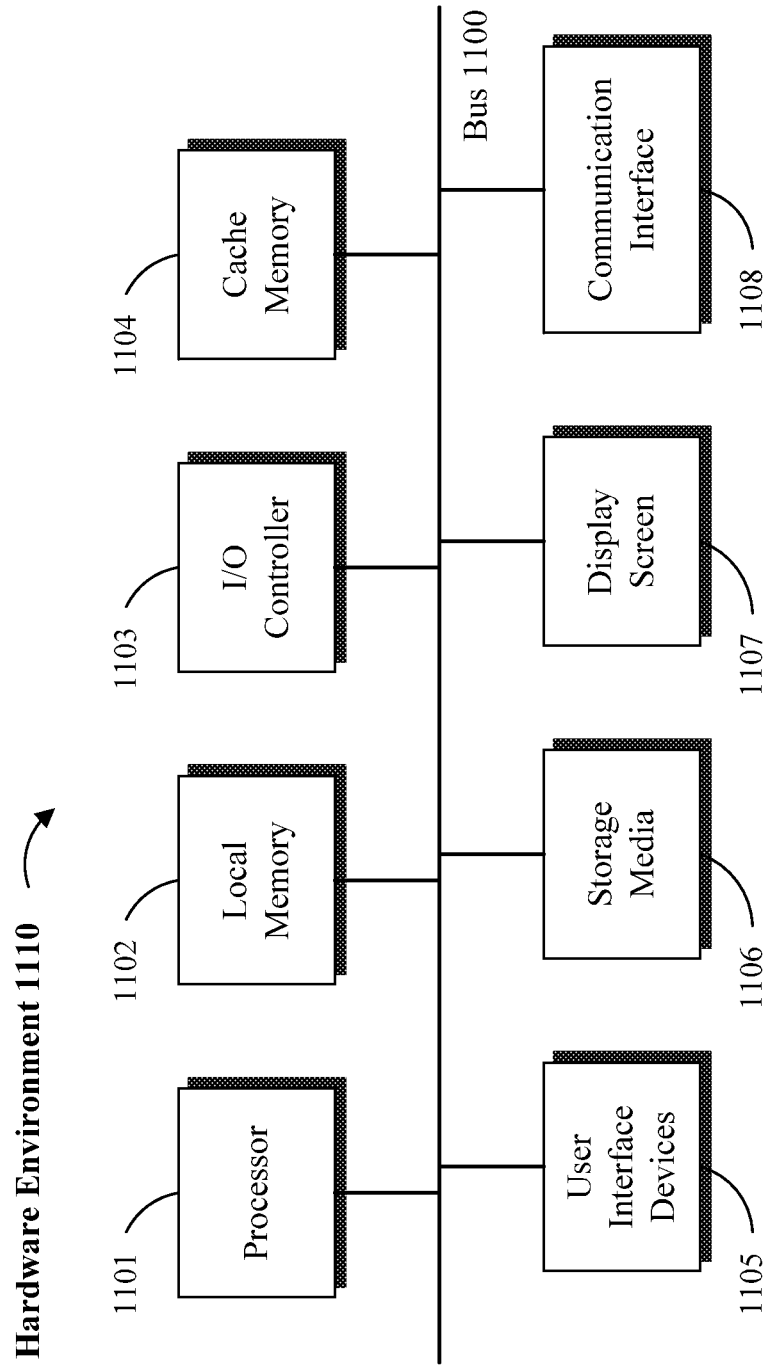
FIGS. 4A and 4B are block diagrams of hardware and software environments in which the disclosed systems and methods may operate, in accordance with one or more embodiments.
Figure 4B:
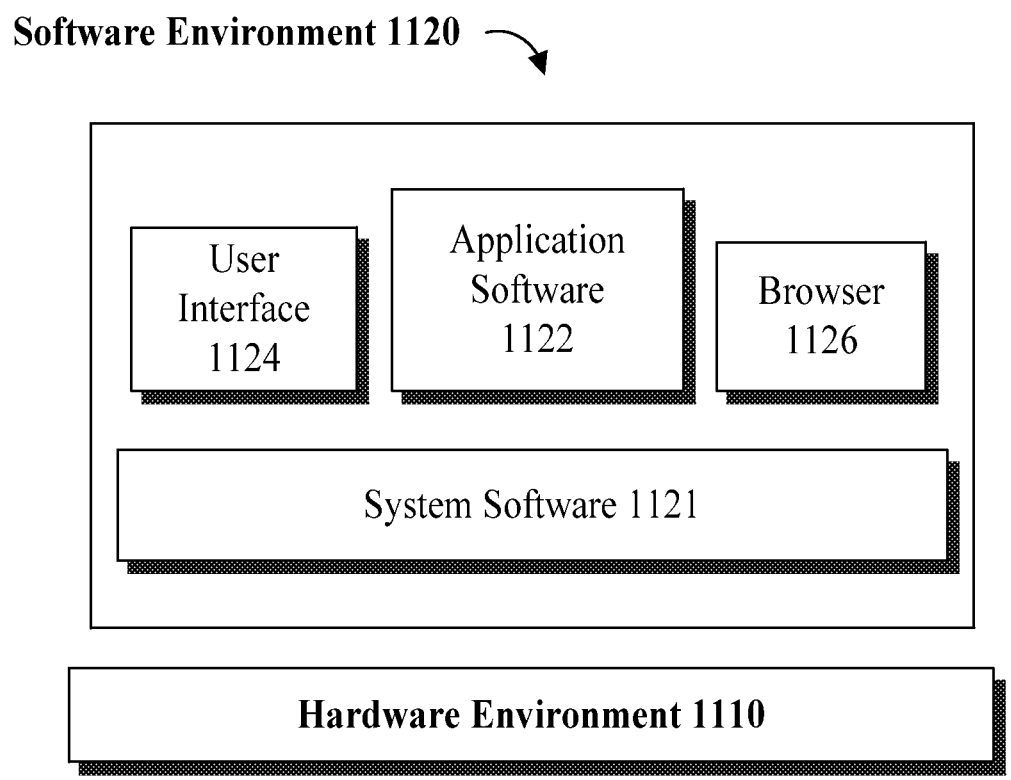

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium is a non-transitory computer readable storage medium and may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-RAY), digital video disk (DVD), high definition video disk (HD-DVD) or Blue-Ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Cloud computing is a model of service delivery for enabling convenient, on-demand network access to a shared pool of configurable computing resources (e.g. networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Using the on-demand self-service, a cloud consumer may unilaterally provision computing capabilities, such as server time and network storage, as needed automatically without requiring human interaction with the service's provider. Broad network access capabilities may be available over a network and accessed through standard mechanisms that promote use by heterogeneous thin or thick client platforms (e.g., mobile phones, laptops, and PDAs).

Resource pooling allows the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity capabilities may be rapidly and elastically provisioned, in some cases automatically, to quickly scale out and rapidly released to quickly scale in. To the consumer, the capabilities available for provisioning often appear to be unlimited and may be purchased in any quantity at any time. Measured service allows cloud systems automatically control and optimize resource use by leveraging a metering capability at some level of abstraction appropriate to the type of service (e.g., storage, processing, bandwidth, and active user accounts). Resource usage may be monitored, controlled, and reported providing transparency for both the provider and consumer of the utilized service.

Several service models are available, depending on implementation. Software as a Service (SaaS) provides the capability to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS) provides the capability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS) provides the capability to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Several deployment models may be provided. A private cloud provides a cloud infrastructure that is operated solely for an organization. It may be managed by the organization or a third party and may exist on-premises or off-premises. A community cloud provides a cloud infrastructure that is shared by several organizations and supports a specific community that has shared concerns (e.g., mission, security requirements, policy, and compliance considerations). It may be managed by the organizations or a third party and may exist on-premises or off-premises.

A public cloud may provide a cloud infrastructure that is made available to the general public or a large industry group and is owned by an organization selling cloud services. A hybrid cloud provides a cloud infrastructure that is a composition of two or more clouds (private, community, or public) that remain unique entities but are bound together by standardized or proprietary technology that enables data and application portability (e.g., cloud bursting for load-balancing between clouds).

Figure 5A:
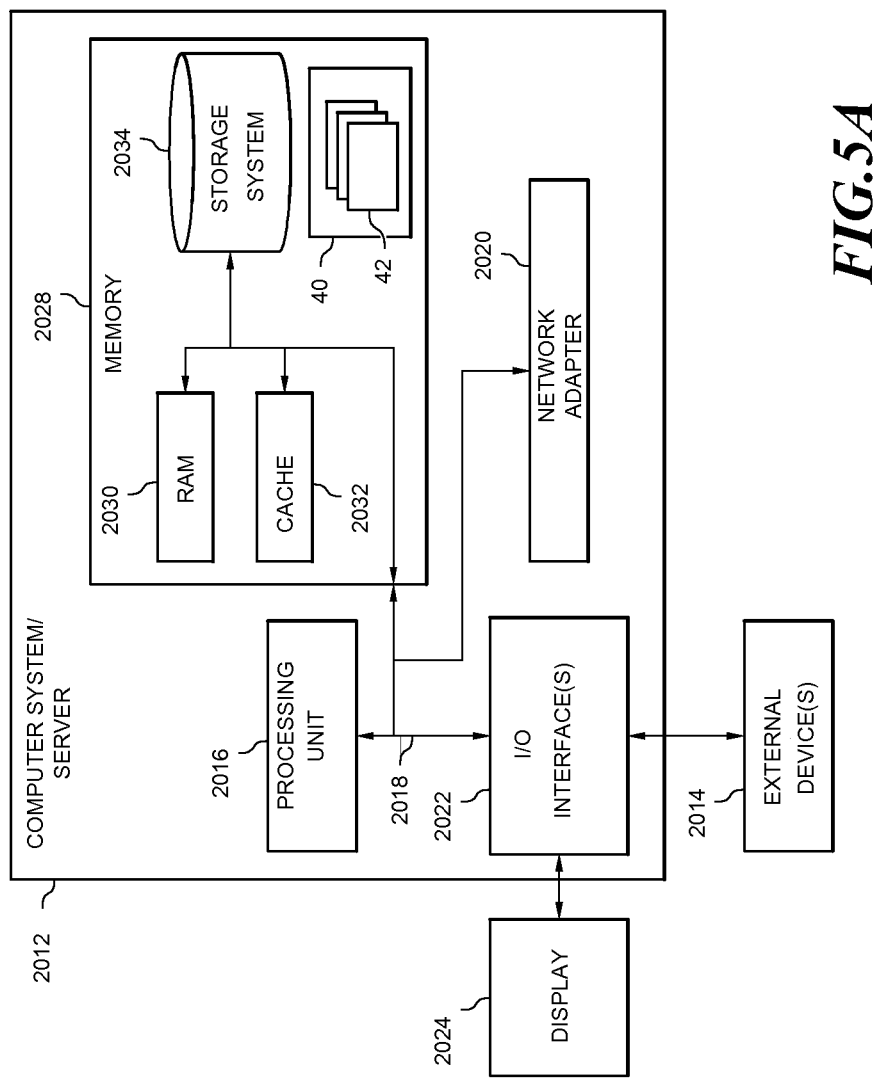
FIGS. 5A, 5B and 5C depict one or more nodes and abstraction model layers in an exemplary network environment that supports a cloud infrastructure, in accordance with one or more embodiments.

A cloud computing environment is service oriented with a focus on statelessness, low coupling, modularity, and semantic interoperability. At the heart of cloud computing is an infrastructure comprising a network of interconnected nodes. Referring now to FIG. 5A, a schematic of an example of a cloud computing node is shown. Cloud computing node 2010 is one example of a suitable cloud computing node and is not intended to suggest any limitation as to the scope of use or functionality of embodiments described herein. Regardless, cloud computing node 2010 is capable of being implemented and/or performing any of the functionality set forth hereinabove.

In cloud computing node 2010, there is a computer system/server 2012, which is operational with numerous other general purpose or special purpose computing system environments or configurations. Examples of well-known computing systems, environments, and/or configurations that may be suitable for use with computer system/server 2012 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 2012 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 2012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5A, computer system/server 2012 in cloud computing node 2010 is shown in the form of a general-purpose computing device. The components of computer system/server 2012 may include, but are not limited to, one or more processors or processing units 2016, a system memory 2028, and a bus 2018 that couples various system components including system memory 2028 to processor 2016.

Bus 2018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 2012 typically includes a variety of computer system readable media. Such media may be any available media that is accessible by computer system/server 2012, and it includes both volatile and non-volatile media, removable and non-removable media. System memory 2028 may include computer system readable media in the form of volatile memory, such as random access memory (RAM) 30 and/or cache memory 32.

Computer system/server 2012 may further include other removable/non-removable, volatile/non-volatile computer system storage media. By way of example, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided.

In some instances, the above components may be connected to bus 2018 by one or more data media interfaces. As will be further depicted and described below, memory 2028 may include at least one program product having a set (e.g., at least one) of program modules that are configured to carry out the functions of one or more embodiments.

Program/utility 2040, having a set (at least one) of program modules 42, may be stored in memory 2028 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of one or more embodiments.

Computer system/server 2012 may also communicate with one or more external devices 2014 such as a keyboard, a pointing device, a display 2024, etc.; one or more devices that enable a user to interact with computer system/server 2012; and/or any devices (e.g., network card, modem, etc.) that enable computer system/server 2012 to communicate with one or more other computing devices. Such communication may occur via I/O interfaces 2022. Still yet, computer system/server 2012 may communicate with one or more networks such as a local area network (LAN), a general wide area network (WAN), and/or a public network (e.g., the Internet) via network adapter 2020.

As depicted, network adapter 2020 communicates with the other components of computer system/server 2012 via bus 2018. It should be understood that although not shown, other hardware and/or software components could be used in conjunction with computer system/server 2012. Examples, include, but are not limited to: microcode, device drivers, redundant processing units, external disk drive arrays, RAID systems, tape drives, and data archival storage systems, etc.

Figure 5B:
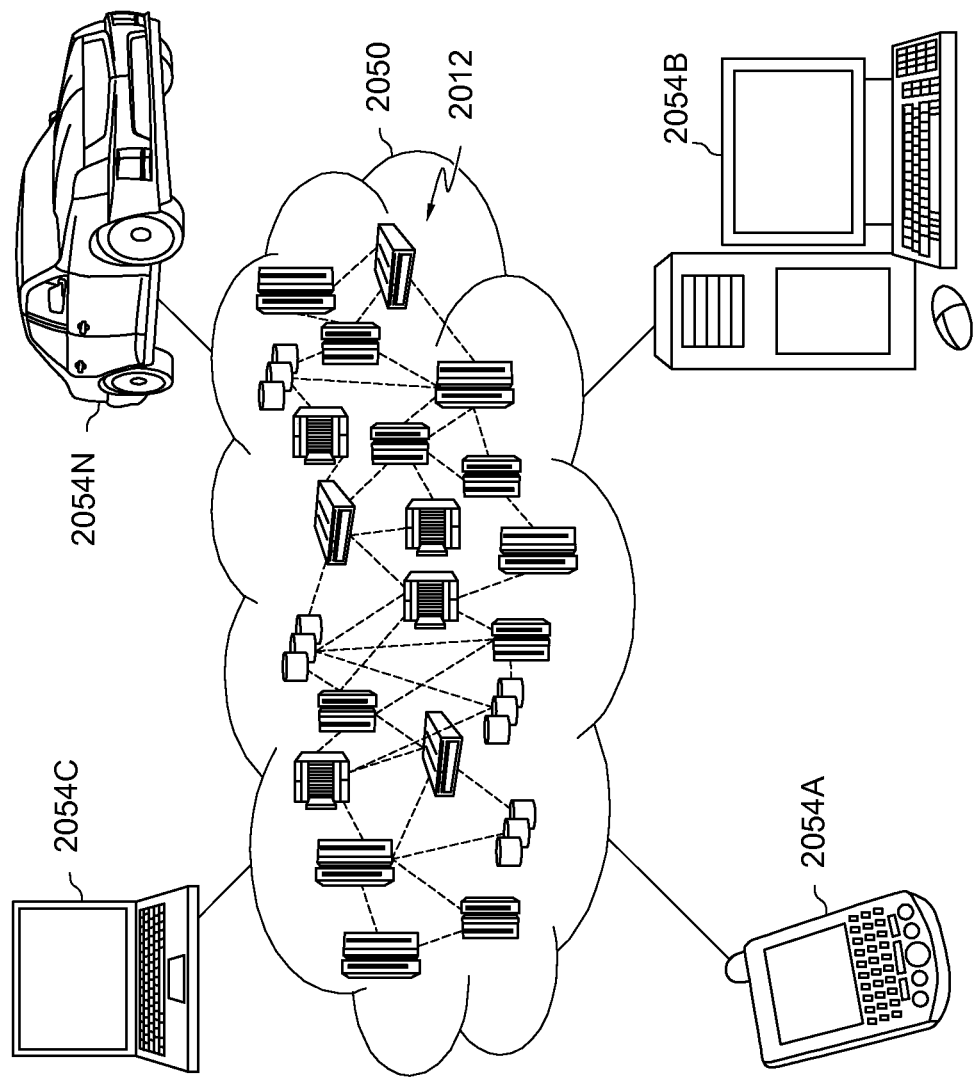

Referring now to FIG. 5B, illustrative cloud computing environment 2050 is depicted. As shown, cloud computing environment 2050 comprises one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate.

Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device.

It is understood that the types of computing devices 54A-N shown in FIG. 5B are intended to be illustrative only and that computing nodes 2010 and cloud computing environment 2050 may communicate with any type of computerized device over any type of network and/or network addressable connection (e.g., using a web browser).

Figure 5C:
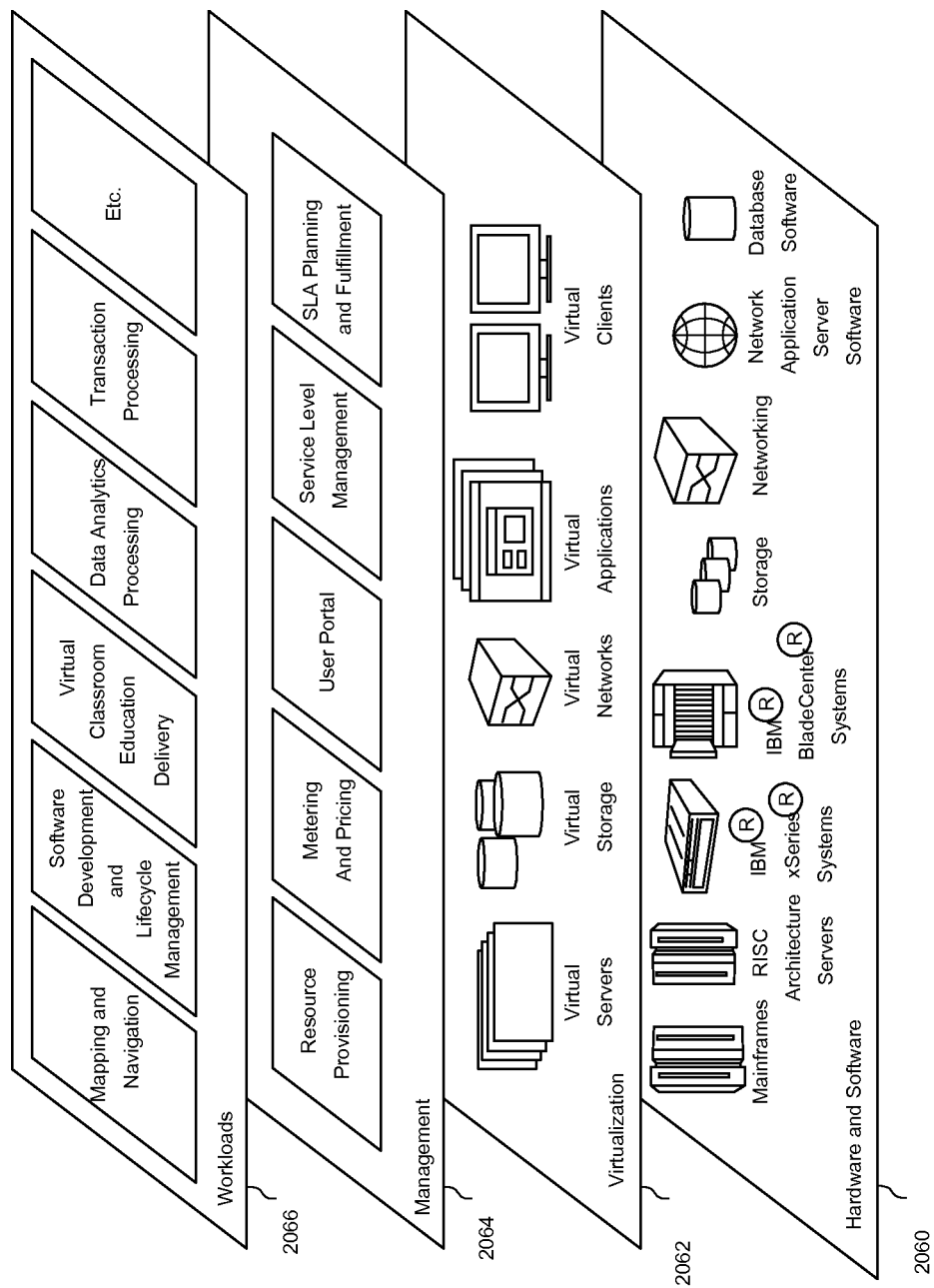

Referring now to FIG. 5C, a set of functional abstraction layers provided by cloud computing environment 2050 (FIG. 5B) is shown. It should be understood in advance that the components, layers, and functions shown in FIG. 5C are intended to be illustrative of one or more embodiments and are not limited thereto. As depicted, the following layers and corresponding functions are provided.

Hardware and software layer 2060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 2062 provides an abstraction layer from which the following examples of virtual entities may be provided: virtual servers; virtual storage; virtual networks, including virtual private networks; virtual applications and operating systems; and virtual clients. In one example, management layer 2064 may provide the functions described below. Resource provisioning provides dynamic procurement of computing resources and other resources that are utilized to perform tasks within the cloud computing environment.

Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met.

Service Level Agreement (SLA) planning and fulfillment provide pre-arrangement for, and procurement of, cloud computing resources for which a future requirement is anticipated in accordance with an SLA. Workloads layer 2066 provides examples of functionality for which the cloud computing environment may be utilized. Examples of workloads and functions which may be provided from this layer include: mapping and navigation; software development and lifecycle management; virtual classroom education delivery; data analytics processing; transaction processing; etc.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer-implemented method for managing capacity over-commitment in a resource provisioning environment, the method comprising:
 collecting historical data about capacity usage in a resource provisioning environment and failure statistics from an operational database, in addition to prior service commitments due to previously contracted service level agreements (SLAs) stored in a SLA repository;

calculating equivalent capacity for the resource provisioning environment based on a defined residual benefit goal, and other business goals instrumented by way of a policy engine;

determining whether placing requested virtual resources on one or more hosts is feasible, in response to determining that sufficient physical capacity is available to host the calculated equivalent capacity and taking into account anti-collocation constraints that prohibit placement of two or more virtual resources on same host, wherein the determining is repeated a number of times (N), wherein the number of times (N) is automatically computed by estimating a confidence interval for a mean of Normal distribution based on a defined significance level, and wherein the determining whether placing requested virtual resources on one or more hosts is feasible comprises checking a target risk level of resource congestion does not exceed a threshold risk probability based on determining a percentage of failures during the repeated number of (N) times; and issuing an unsafe over-commit level warning based on the determination that placing requested virtual resources on one or more hosts is not feasible.

2. The method of claim 1 wherein taking into account anti-collocation constraints comprises:

computing empirical probability distribution functions (PDF) for virtual resources in a service cluster; and generating a random placement problem instance based on the computed empirical PDFs.

3. The method of claim 2 wherein the empirical PDFs are computed based on predetermined acceptable risk levels defined for a requested service.

4. The method of claim 1 further comprising admitting a requested service by the service subscriber, in response to determining that placing requested virtual resources on one or more hosts is feasible such that sufficient physical capacity is available to host the calculated equivalent capacity.

5. The method of claim 4 further comprising generating a placement problem instance and validating the placement.

6. The method of claim 5 further comprising authorizing capacity over-commitment, in response to determining that risk of failure as a result of over-commitment is below a first threshold.

7. The method of claim 1 further comprising notifying a capacity planner that additional physical capacity is needed to cover the calculated equivalent capacity, in response to determining that the physical capacity is insufficient to host the calculated equivalent capacity.

8. A computer-implemented system for managing capacity over-commitment in a resource provisioning environment, the system comprising:

one or more processors to executed instruction loaded from a memory;

a logic unit for collecting historical data about capacity usage in a resource provisioning environment and failure statistics from an operational database, in addition to prior service commitments due to previously contracted service level agreements (SLAs) stored in a SLA repository;

a logic unit for calculating equivalent capacity for the resource provisioning environment based on a defined residual benefit goal, and other business goals instrumented by way of a policy engine;

a logic unit for determining whether placing requested virtual resources on one or more hosts is feasible, in response to determining that sufficient physical capacity is available to host the calculated equivalent capacity and taking into account anti-collocation constraints that prohibit placement of two or more virtual resources on same host, wherein the determining is repeated a number of times (N), wherein the number of times (N) is automatically computed by estimating a confidence interval for a mean of Normal distribution based on a defined significance level, and wherein the determining whether placing requested virtual resources on one or more hosts is feasible comprises checking a target risk level of resource congestion does not exceed a threshold risk probability based on determining a percentage of failures during the repeated number of (N) times; and issuing an unsafe over-commit level warning based on the determination that placing requested virtual resources on one or more hosts is not feasible.

9. The system of claim 8 wherein the anti-collocation constraints are taking into account by computing empirical probability distribution functions (PDF) for virtual resources in a service cluster; and generating a random placement problem instance based on the computed empirical PDFs.

10. The system of claim 8 wherein the empirical PDFs are computed based on predetermined acceptable risk levels defined for a requested service.

11. A computer program product comprising a non-transitory computer readable storage medium having a computer readable program, wherein the computer readable program when executed on a computer causes the computer to:

collect historical data about capacity usage in a resource provisioning environment and failure statistics from an operational database, in addition to prior service commitments due to previously contracted service level agreements (SLAs) stored in a SLA repository;

calculate equivalent capacity for the resource provisioning environment based on a defined residual benefit goal, and other business goals instrumented by way of a policy engine;

determine whether placing requested virtual resources on one or more hosts is feasible, in response to determining that sufficient physical capacity is available to host the calculated equivalent capacity and taking into account anti-collocation constraints that prohibit placement of two or more virtual resources on same host, wherein the determining is repeated a number of times (N), wherein the number of times (N) is automatically computed by estimating a confidence interval for a mean of Normal distribution based on a defined significance level, and wherein the determining whether placing requested virtual resources on one or more hosts is feasible comprises checking a target risk level of resource congestion does not exceed a threshold risk probability based on determining a percentage of failures during the repeated number of (N) times; and issuing an unsafe over-commit level warning based on the determination that placing requested virtual resources on one or more hosts is not feasible.

12. The computer program product of claim 11 wherein account anti-collocation constraints are taken into account by computing empirical probability distribution functions (PDF) for virtual resources in a service cluster; and generating a random placement problem instance based on the computed empirical PDFs.

13. The computer program product of claim 11 wherein the empirical PDFs are computed based on predetermined acceptable risk levels defined for a requested service.

* * * * *